United States Patent
Nguyen et al.

(10) Patent No.: US 11,745,343 B2
(45) Date of Patent: Sep. 5, 2023

(54) METHOD AND APPARATUS FOR CONTROLLING ROBOT ARMS USING ELASTIC DISTORTION SIMULATIONS

(71) Applicants: Darrion Vinh Nguyen, Milpitas, CA (US); Hao-Nhien Qui Vu, Fountain Valley, CA (US)

(72) Inventors: Darrion Vinh Nguyen, Milpitas, CA (US); Hao-Nhien Qui Vu, Fountain Valley, CA (US)

( * ) Notice: Subject to any disclaimer, the term of this patent is extended or adjusted under 35 U.S.C. 154(b) by 299 days.

(21) Appl. No.: 16/952,070

(22) Filed: Nov. 18, 2020

(65) Prior Publication Data

US 2022/0152822 A1   May 19, 2022

(51) Int. Cl.
*B25J 9/16* (2006.01)
(52) U.S. Cl.
CPC ........... *B25J 9/1641* (2013.01); *B25J 9/1607* (2013.01); *B25J 9/1653* (2013.01)
(58) Field of Classification Search
CPC ...... B25J 9/1641; B25J 9/1607; B25J 9/1653; B25J 9/1635; B25J 9/1605; G05B 2219/39186; G05B 2219/40279
See application file for complete search history.

(56) References Cited

U.S. PATENT DOCUMENTS

| | | | | |
|---|---|---|---|---|
| 10,786,910 | B2 * | 9/2020 | Asada | B25J 13/089 |
| 2011/0264111 | A1 * | 10/2011 | Nowlin | B25J 9/1682 |
| | | | | 606/130 |
| 2018/0015620 | A1 * | 1/2018 | Nakaya | B25J 19/063 |
| 2020/0298403 | A1 * | 9/2020 | Nilsson | B25J 9/1692 |

FOREIGN PATENT DOCUMENTS

| | | | | |
|---|---|---|---|---|
| CN | 109176532 B | * | 9/2020 | ............ B25J 9/1664 |
| WO | WO-2015030650 A2 | * | 3/2015 | ................ B25J 9/16 |

OTHER PUBLICATIONS

Wang, L.-C.T. and Chen, C.C., "A Combined Optimization Method for Solving the Inverse Kinematics Problem of Mechanical Manipulators", IEEE Transactions On Robotics and Automation, Aug. 1991, vol. 7, Issue: 4, IEEE, USA.
Aristidou, A. and Lasenby, J., "FABRIK: A fast, iterative solver for the Inverse Kinematics problem", Graphical Models, May 2011, 73 (2011) 243-260, Elsevier, Netherlands.

* cited by examiner

*Primary Examiner* — Jonathan L Sample
*Assistant Examiner* — Byron Xavier Kasper

(57) ABSTRACT

The present disclosure generally relates to the field of robotics and computer animation, more particularly, method and apparatus to solve the inverse kinematics problem to control a kinematic chain such as a robot arm or an animation character's skeleton to reach a target position. The new method simulates a kinematic chain whose links and joints are elastic and can be distorted. The method distorts the kinematic chain to move its end to the target position, calculates distortions, and iteratively adjusts link and joint configurations of the kinematic chain to reduce distortions while keeping its end at the target position until a solution with near zero distortions is found. The resulting link and joint configurations of the simulated kinematic chain then can be used for the actual kinematic chain to reach the same target position.

18 Claims, 5 Drawing Sheets

KINEMATIC NOTATIONS OF A ROBOT ARM

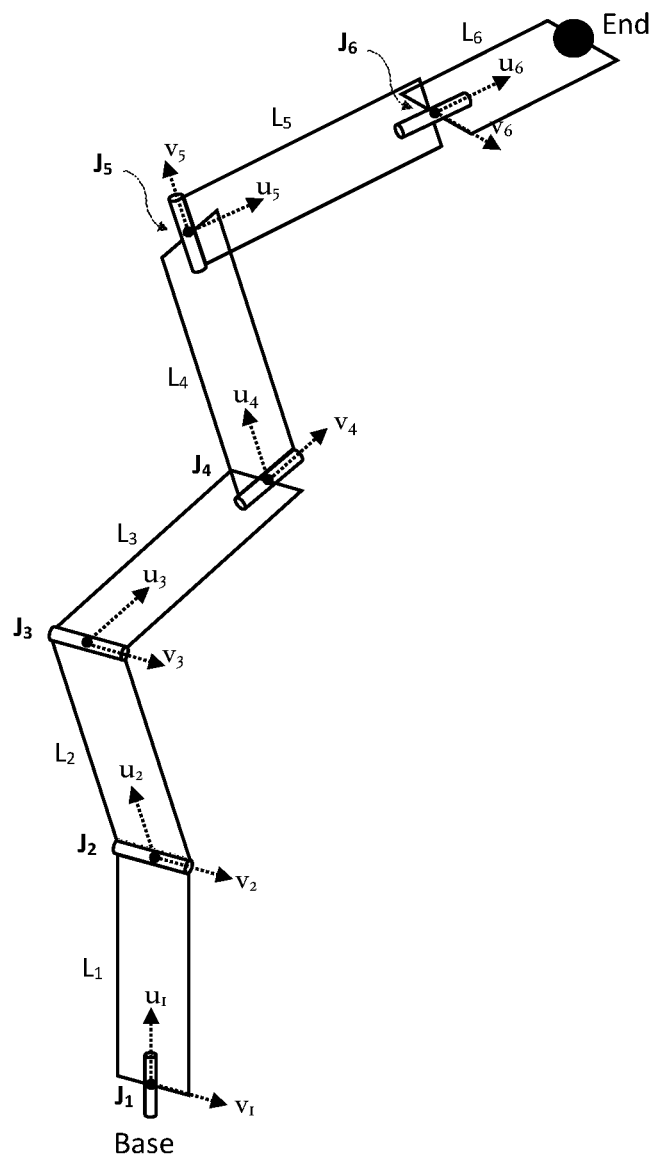
Fig. 1: KINEMATIC NOTATIONS OF A ROBOT ARM

Fig. 2A: LENGTH DISTORTION
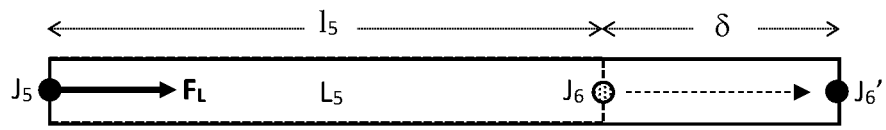
$$D_L = \delta / l_5 = | \, |J_6' - J_5| - l_5 \, | / l_5$$
Fig. 2B: BENDING DISTORTION
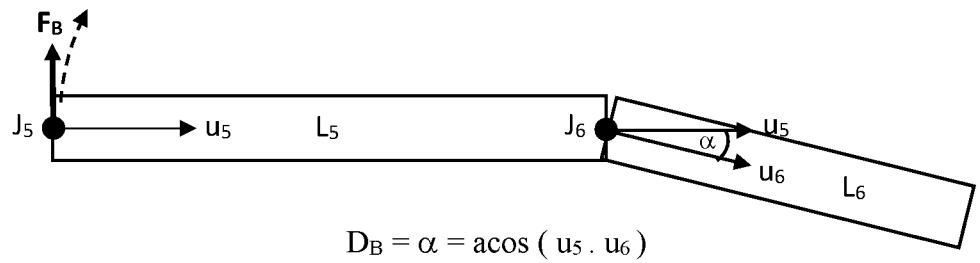
$$D_B = \alpha = \text{acos} \, ( \, u_5 \, . \, u_6 \, )$$
Fig. 2C: TWISTING DISTORTION
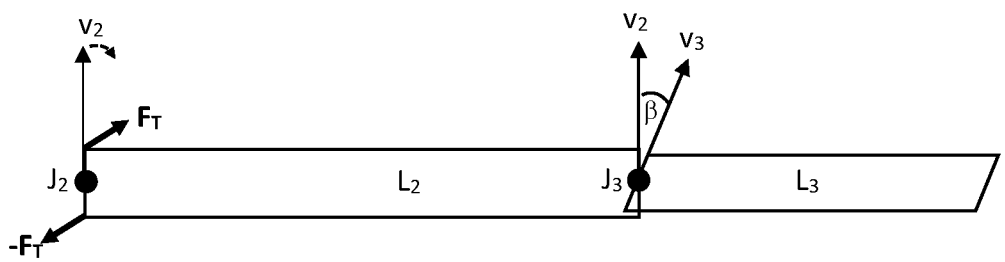
$$D_T = \beta = \text{acos} \, ( \, v_2 \, . \, v_3 \, )$$

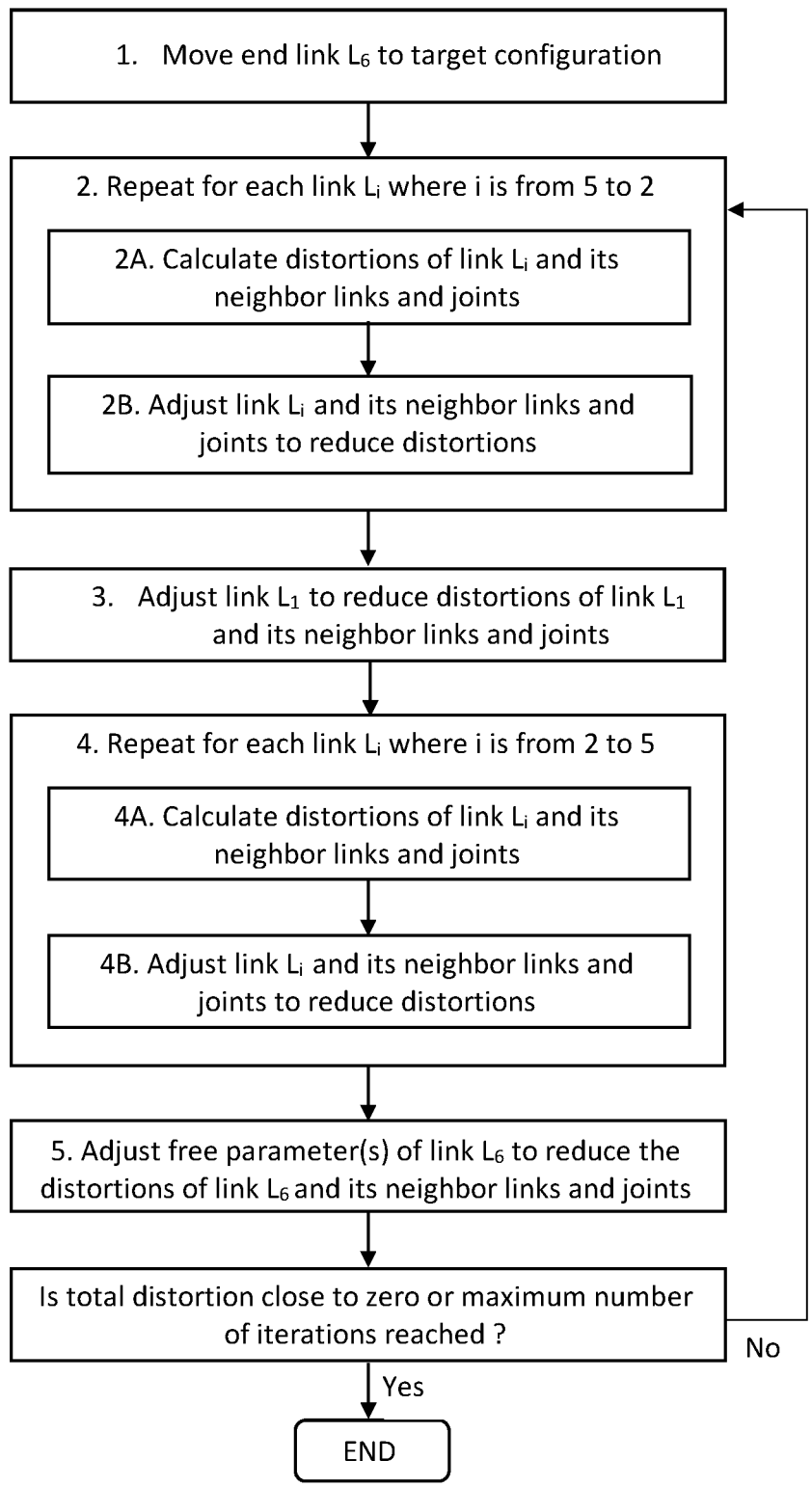
Fig. 3: ELASTIC DISTORTION ALGORITHM

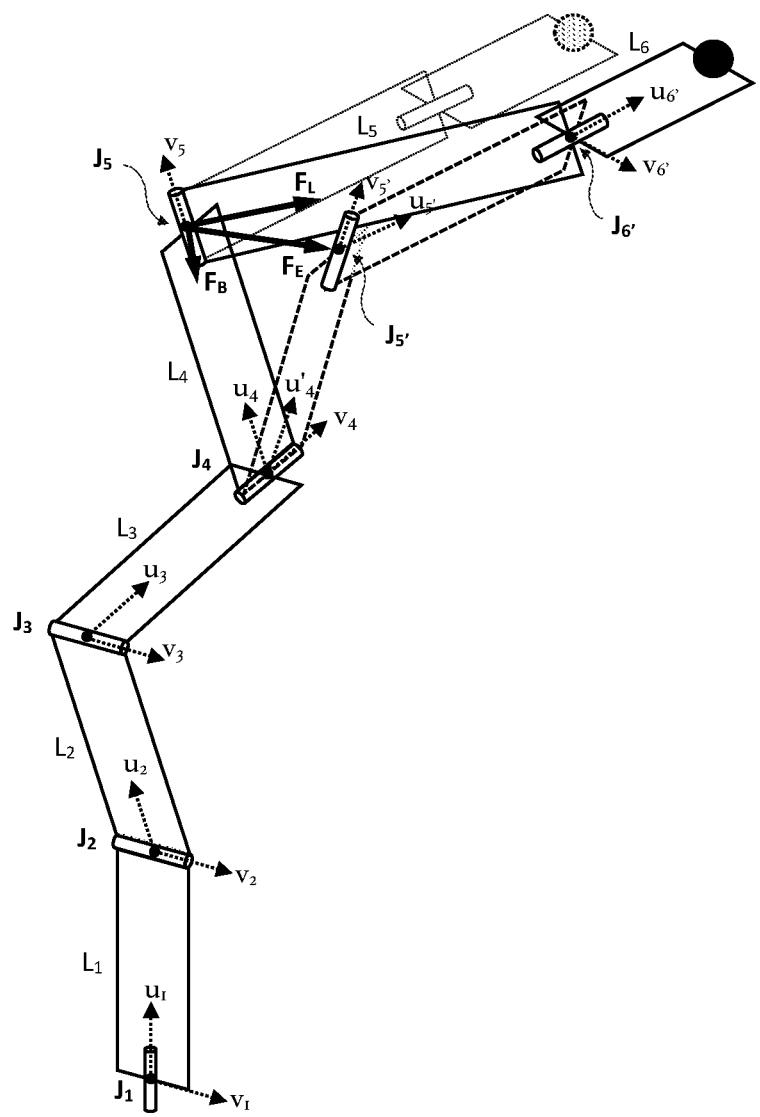
Fig. 4: ELASTIC DISTORTION REDUCTIONS

Fig. 5: PROGRAM OUTPUTS
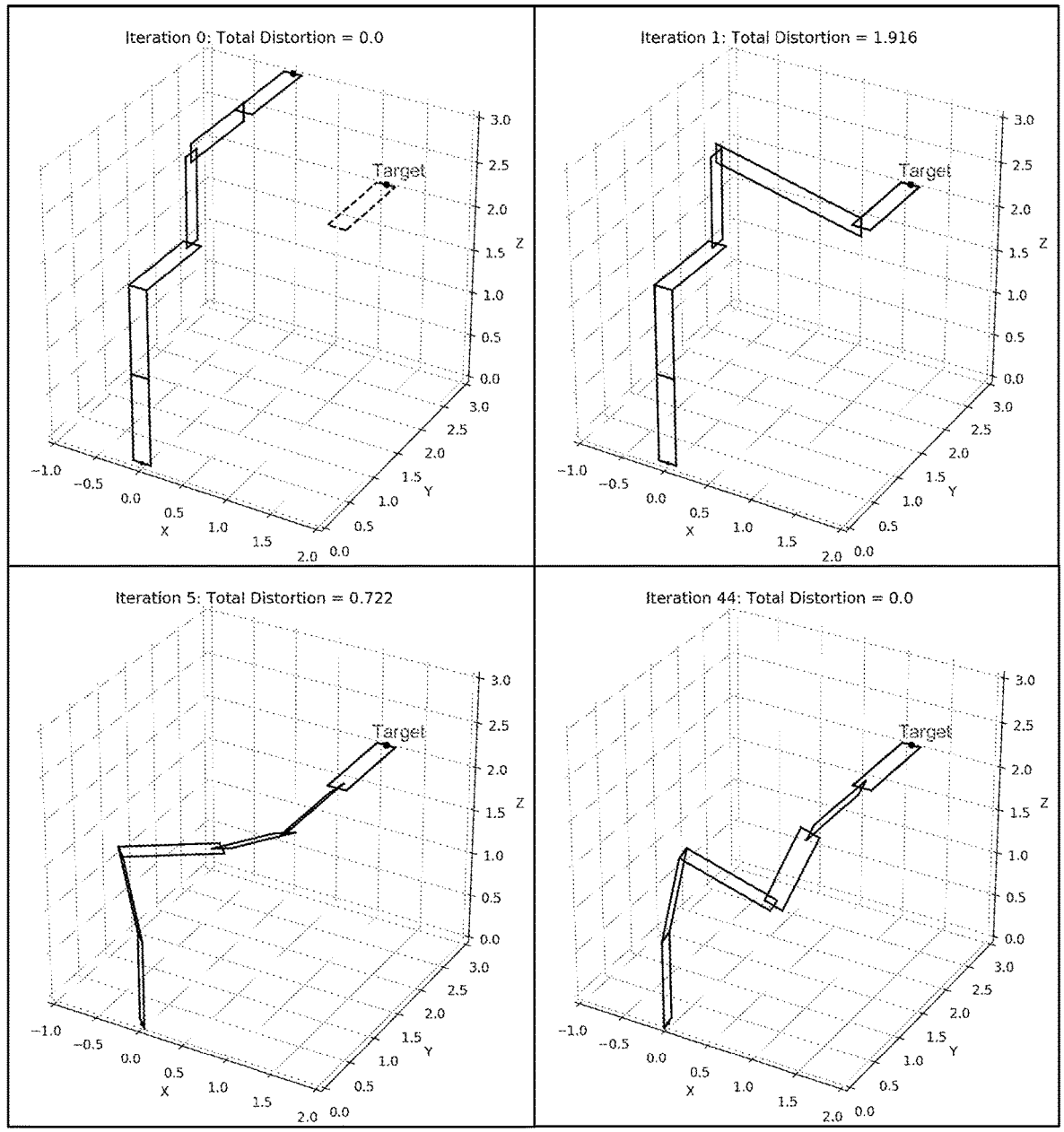

METHOD AND APPARATUS FOR CONTROLLING ROBOT ARMS USING ELASTIC DISTORTION SIMULATIONS

TECHNICAL FIELD

The present disclosure generally relates to the field of robotics and computer animation, more particularly, solving inverse kinematics to calculate the link and joint configurations needed to control a kinematic chain such as a robot arm or an animation character's skeleton to reach a target position.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

In robotics, forward kinematics is to find the position of the end of a robot arm given its link and joint configurations such as joint rotation angles, while inverse kinematics is to find a set of link and joint configurations that move the end of a robot arm to a given target position. Inverse kinematics is also used in computer animation to find the joint rotations needed to move a skeleton to a desired posture. In general, inverse kinematics is harder than forward kinematics, especially when there are large numbers of links and joints and additional factors such as obstacles.

Some robot arms have analytical inverse kinematics solutions which are closed-form formulas that can calculate link and joint configurations given a target position. Analytical solutions are fast, but they may result in robot movements that are not smooth, and in many cases analytical solutions are hard to find or even non-existent. Alternatively, many robotic and animation applications use numerical methods to find approximate solutions for the inverse kinematics problems. Numerical methods such as the Jacobian Inverse Technique are computationally intensive, while other methods such as the Cyclic Coordinate Descent (CCD) method may result in unnatural positions.

This disclosure describes a new numerical method that provides fast and natural inverse kinematics solutions for robot arms and other kinematic chains. The new method simulates a robot arm that has elastic links and joints, moves the end of the robot arm to a target position, calculates distortions caused by that movement, and iteratively reconfigures the links and joints to reduce distortions until a solution that is free of distortions is found.

BRIEF DESCRIPTION OF THE DRAWINGS

To provide a more complete understanding of the present disclosure and advantages thereof, reference is made to the attached drawings, like reference numbers represent like parts, in which:

FIG. 1 illustrates an example robot arm and the kinematic notations that describe its link and joint configurations.

FIGS. 2A, 2B and 2C illustrate different types of elastic distortions of the links and joints of the example robot arm. FIG. 2A illustrates a length distortion. FIG. 2B illustrates a bending distortion. FIG. 2C illustrates a twisting distortion.

FIG. 3 illustrates an embodiment of the elastic distortion algorithm that solves inverse kinematics by simulating elastic distortions.

FIG. 4 illustrates elastic distortion reductions using elastic force simulations.

FIG. 5 shows sample outputs from a computer program that embodies the elastic distortion algorithm.

DESCRIPTION OF EXAMPLE EMBODIMENTS

Overview

A new numerical inverse kinematics method to calculate link and joint configurations of a robot arm to move its end to a target position. The method pretends that the links and joints of the robot arm are infinitely elastic, meaning that the method pretents that they can be distorted, stretched, compressed, bent, or twisted arbitrarily without being broken. The method first moves the end of the robot arm from its initial position to the target position and measures the elastic distortions caused by that movement. The method then iteratively reconfigures the links and joints of the robot arm to reduce distortions while keeping the end of the robot arm at the target position until the total distortion of the whole system is reduced to zero or near zero. In each iteration, the method reconfigures a small set of adjacent links and joints and utilizes different options to find link and joint configurations that reduce the distortions. One option is to use an optimization technique such as Gradient Descent to search for link and joint configurations that minimize the total distortions. Another option is to simulate elastic forces caused by the distortions and apply these forces to move links and joints accordingly to relieve their distortions. The third option is to find link and joint configurations that deviate from the constraints of the robot arm and correct these deviations to eliminate corresponding distortions.

Once a set of link and joint configurations are found for the simulated elastic robot arm to reach a target position with no elastic distortions, the same link and joint configurations can be used for the actual robot arm to reach the same target position.

Because of its imitation of elasticity physics, the method can provide solutions that have smooth and natural robot movements. The method is fast as it involves only a small set of adjacent links and joints in each iteration, unlike other numerical methods which requires optimizing large numbers of parameters of the whole robot arms in each iteration. The method can be generalized to handle obstacles and other external conditions

DETAILED DESCRIPTION

FIG. 1 illustrates an example robot arm and the kinematic notations used in this disclosure to specify its link and joint configurations.

The configuration of a link is specified by the position of its base joint and two orientation vectors. The base joint of a link is the joint closer to the base in the kinematic chain of the robot arm. The first orientation vector of a link is a unit vector that points from the base joint to the other joint of the link, and the second orientation vector is a unit vector that is orthogonal to the first orientation vector. For example, in FIG. 1, the configuration of link $L_2$ is represented by tuple $[J_2, u_2, v_2]$ where $J_2$ is the position of the base joint of link $L_2$, $u_2$ is the first orientation vector pointing from the base joint $J_2$ to the next joint $J_3$, and $v_2$ is the second orientation vector that is orthogonal to $u_2$. Vectors $u_2$ and $v_2$ together represent a cross section of link $L_2$ as it rotates around join $J_2$.

The configuration of a joint is specified by its position and rotation angle, both of which can be derived from the link configurations described above. In particular, the rotation angle of a joint can be derived from the orientation vectors of the adjacent links. For example, in FIG. 1, the position of the first joint $J_1$ is a part of the configuration $[J_1, u_1, v_1]$ of link $L_1$, and the joint rotation angle of joint $J_1$ can be derived from the orientation vector $v_1$ of link $L_1$. Similarly, the position of the second joint $J_2$ is a part of the configuration $[J_2, u_2, v_2]$ of link $L_2$, and its rotation angle is the angle between $u_1$ and $u_2$.

As the robot arm moves, its link and joint configurations vary but are subject to constraints. One set of constraints are the length constraints of the links. For example, as link $L_1$ rotates around joint $J_1$, the position of joint $J_2$ changes, but the distance between joints $J_1$ and $J_2$ remains a constant which is the length $l_1$ of link $L_1$. In general, if $l_i$ is the length of link $L_i$ and $|J_{i+1}-J_i|$ are the distance between joints $J_{i+1}$ and $J_i$, then the length constraints of the robot arm in FIG. 1 can be written as:

$|J_2-J_1|=l_1$      Length Constraint 1:

$|J_3-J_2|=l_2$      Length Constraint 2:

$|J_4-J_3|=l_3$      Length Constraint 3:

$|J_5-J_4|=l_4$      Length Constraint 4:

$|J_6-J_5|=l_5$      Length Constraint 5:

Another set of constrains are the joint constraints that limit the orientations of the links as they rotate around the joint rotation axis. For example, the rotation axis of joint $J_1$ is the upright unit vector $z_0$. As link $L_1$ rotates around joint $J_1$, its second orientation vector $v_1$ varies, but its first orientation vector $u_1$ is subject to the constraint that $u_1$ is fixed and aligns with $z_0$. Similarly, as link $L_2$ rotates around joint $J_2$, its first orientation vector $u_2$ varies, but its second orientation vector $v_2$ is subject to the constraint that $v_2$ aligns with the second orientation vector $v_1$ of link $L_1$. The joint constraints of the robot arm in FIG. 1 can be written as:

$u_1=z_0$      Joint Constraint 1:

$v_2=v_1$      Joint Constraint 2:

$v_3=v_2$      Joint Constraint 3:

$v_4=u_3$      Joint Constraint 4:

$v_5=u_4$      Joint Constraint 5:

$u_6=u_5$      Joint Constraint 6:

The robot arm may have additional joint constraints that limit the rotation angles of some joints. For example, if joint $J_2$ can only rotate from 0 to 90 degree, then there is a corresponding constraint that the angle between $u_2$ and $u_1$ must be in the same range.

Using the about notations, the forward kinematics of a robot arm can be easily calculated from the joint rotation angles. For example, starting the configuration $[J_1, u_1, v_1]$ of the base link $L_1$ and the joint rotation angle $r_2$ of joint $J_2$, the configuration $[J_2, u_2, v_2]$ of the next link $L_2$ can be calculated using simple vector calculations:

$J_2=J_1+l_1 \cdot u_1$ $v_2=v_1$ $u_2=R_2 \cdot u_1$, where $R_2$ is the rotation matrix by angle $r_2$ around axis $v_2$ To solve the inverse kinematics problem, the new method simulates a robot arm whose links and joints are elastic and can be distorted Links and joints are distorted when their configurations deviate from the constraints of the robot arm. For example, a link is stretched or compressed when it deviates from its length constraint. Similarly, a link is bended or twisted when its orientation deviates from a joint constraint.

FIGS. 2A, 2B, and 2C illustrate different types of elastic distortions and how they can be quantified using a distortion measurement that calculates distortions according to the deviations of the link and joint configurations from their constraints.

FIG. 2A illustrates a length distortion which is caused by a deviation of a length constraint. In FIG. 2A, link $L_5$ is stretched when joint $J_6$ at the end of link $L_5$ is moved to $J_6'$, and the new length $|J_6'-J_5|$ of link $L_5$ no longer satisfies Length Constraint 5 that $|J_6'-J_5|=l_5$. The length distortion $D_L$ of link $L_5$ can be measured by the deviation of its length from the length constraint using the following formula:

$D_L=\delta l_5=||J_6'-J_5|-l_5|/l_5$

FIG. 2B illustrates a bending distortion which is caused by a deviation of the first orientation vector of a link from a joint constraint. In FIG. 2B, link $L_5$ is bended when its first orientation vector $u_5$ deviates from the first orientation vector $u_6$ of link $L_6$ as required by Joint Constraint 6 that $u_5=u_6$. The bending distortion in this case can be measured by the deviation angle $\alpha$ between $u_5$ and $u_6$:

$D_B=\alpha=a\cos(u_5 \cdot u_6)$

Alternatively, $D_{B5}$ can be measured by the Manhattan distance between $u_5$ and $u_6$:

$D_B=|u_{5x}-u_{6x}|+|u_{5y}-u_{6y}|+|u_{5z}-u_{6z}|$

FIG. 2C illustrates a twisting distortion which is caused by a deviation of the second orientation vector of a link from a joint constraint. In FIG. 2C, link $L_2$ is twisted when its second orientation vector $v_2$ deviates from the second orientation $v_3$ of link $L_3$ as required by Joint Constraint 3 that $v_2=v_3$. The twisting distortion in this case can be measured by the deviation angle $\beta$ between $v_2$ and $v_3$:

$D_T=\beta=a\cos(v_2 \cdot v_3)$

Alternatively, $D_{T5}$ can be measured by the Manhattan distance between $v_2$ and $v_3$:

$D_T=|v_{2x}-v_{3x}|+|u_{2y}-u_{3y}|+|v_{2z}-u_{3z}|$

Using a distortion measurement such as the one described above, the new method solves the inverse kinematics problem of a simulated elastic robot arm by distorting the robot arm to move its end to the desired target location and iteratively reducing distortions by adjusting the link and joint configurations until the robot arm is free of distortions.

FIG. 3 illustrates an example embodiment of the elastic distortion algorithm that solves the inverse kinematics problem of the robot arm in FIG. 1. In step 1, the end link $L_6$ of the robot arm is moved to the desired target position. Since link $L_5$ is elastic, it remains attached to $L_6$, but the relocation of $L_6$ distorts $L_5$.

In step 2, the algorithm iterates from link $L_5$ to $L_2$ and adjusts their configurations to reduce distortions. In particular, for each link $L_i$, step 2A calculates the distortions of link $L_i$ and its neighbor links and joints, and step 2B adjusts the configuration of link $L_i$ and its neighbor links and joints to reduce their distortions. In general, changing the configuration of a link or joint may affect the configurations of its neighbor links and joints and their distortions. For example, moving the position of joint $J_i$ changes the orientations of neighbor links $L_i$ and $L_{i-1}$ and affects their distortions. By taking the neighbor links and joints into account, the algorithm aims at reducing the total distortion of the system in each iteration.

After step 2 completes adjusting links L5 to L2, step 3 of the algorithm adjusts link $L_1$ to reduce the distortions of link $L_1$ and its neighbor links and joints while ensuring that $L_1$ is properly attached to the base of the robot arm. Step 4 then repeats similar adjustments as in step 2 but in opposite order, from link $L_2$ to $L_5$, to further reduce the distortions of the system. In step 5, the algorithm adjusts the free parameters of link $L_6$ that are not bound by the target configuration to reduce the distortions of link $L_6$ and its neighbor links and joints. The algorithm then repeats steps 2, 3, 4, and 5 until the total distortion of the system is close to zero within a margin of error. The resulting link and joint configurations of the simulated elastic robot arm then can be used for the actual robot arm to reach similar target position. If the algorithm cannot reduce the total distortion to near zero after certain maximum number of iterations, the algorithm returns an error indicating that the target cannot be reached.

When adjusting the links in steps 2 to 5, the algorithm can use different options to find new link and joint configurations that reduce distortions. The first option is to use an optimization method such as Gradient Descent to find configurations that minimizes the objective function which is the sum of the distortions of a link and its neighbor links and joints. For example, for each link $L_i$, Gradient Descent can be used to find a configuration $[J_i, u_i, v_i]$ that minimizes the sum of the distortions of link $L_i$ and its neighbor links and joints. Unlike optimizations used in other numerical inverse kinematics methods which involve large numbers of parameters of the entire robot arm in each iteration, optimizations in the new method involves only a small set of neighbor links and joints in each iteration, and thus it is more efficient and converges faster. In addition, if the distortion measurement is a piece-wise linear function of the configuration parameters, e.g. when the Manhattan distances are used to measure joint constraint deviations, then the Piece-wise Linear Programming method can be used to efficiently minimize distortions.

The second option to reduce distortions is to simulate elastic forces caused by the distortions and apply these forces to adjust the links and joints accordingly to relieve their distortions. FIGS. 2A, 2B and 2C illustrate elastic forces caused by different types of elastic distortions. In FIG. 2A, the length distortion (stretching) of link $L_5$ results in elastic force $F_L$ that pulls $J_5$ closer to $J_6'$. The magnitude of elastic force $F_L$ is proportional to the length distortion $D_L$. In FIG. 2B, the bending distortion of link $L_5$ results in elastic force $F_B$ that tends to rotate $L_5$ to realign its orientation vector $u_5$ with $u_6$ to restore Joint Constraint 6. The magnitude of $F_B$ is proportional to the bending distortion $D_B$. In FIG. 2C, the twisting distortion to link $L_2$ results in a pair of elastic forces $F_T$ and $-F_T$ that tend to twist $L_2$ to realign its orientation vector $v_2$ with $v_3$ to restore Joint Constraint 3. The magnitudes of $F_T$ and $-F_T$ are proportional to the twisting distortion $D_T$.

Since elastic forces tend to counter the elastic distortions that cause them, the new method simulates the effects of elastic forces to move distorted links and joints to new configurations with smaller distortions. FIG. 4 illustrates the simulated elastic forces on link $L_5$ after link $L_6$ is moved from its initial configuration $[J_6, u_6, v_6]$ to target configuration $[J_6', u_6', v_6']$. Since the distance between $J_6'$ and $J_5$ is longer than the original length of link $L_5$, linked $L_5$ is stretched, resulting in elastic force $F_L$ that pulls the base joint $J_5$ of link $L_5$ toward $J_6'$. At the same time, the first orientation vector of $L_5$ which points from $J_5$ to $J_6'$ is no longer aligned with $u_6'$ as required by Joint Constraint 6. This bending distortion results in another elastic force $F_B$ that tends to rotate link $L_5$ to realign it first orientation vector with $u_6'$. The sum of $F_L$ and $F_B$ is elastic force $F_E$. The algorithm simulates the effect of elastic force $F_E$ that moves the base joint $J_5$ of link $L_5$ along the direction of $F_E$ to new position $J_5'$ as showed in FIG. 4. Similarly, elastic forces can be simulated to twist link $L_5$'s second orientation vector $v_5$ toward $v_5'$ to realign it with the new orientation vector $u_4'$ according to Joint Constraint 5 that $v_5'=u_4'$. The new configuration $[J_5', u_5', v_5']$ of link $L_5$ results in smaller distortions for link $L_5$ and its neighbor links and joints.

The third option to reduce distortions is to correct the constraint deviations that cause them, if such corrections result in a net reduction in total distortion. For example, after end link $L_6$ is moved to the target position, the total distortion of links $L_5$ and its neighbor links and joints may be reduced by the following corrections:

Set $u_5'=u_6'$ to correct the violation of Joint Constraint 6

Set $J_5'=J_6'-u_5' \cdot l_5$ to correct the violation of Length Constraint 5

Set $v_5'=u_4'$ to correct the violation of Joint Constraint 5

This method can quickly find candidate reconfigurations with few calculations, but it may not always result in a net reduction in total distortion, since changing a configuration parameter to correct one constraint deviation may cause another deviation of a different constraint that results in a net increase in total distortion. In iterations when this is the case, the algorithm can fall back to the elastic force simulation option or the Gradient Descent option to reduce the total distortion of the system.

FIG. 5 shows the outputs of a computer program that embodies the elastic distortion algorithm to solve the inverse kinematics of a robot arm with six links. Iteration 0 shows the initial configurations of the robot arm and the target position for the end link. Iteration 1 shows the distorted robot arm after its end link is moved to the target position. Iteration 5 show the robot arm with reduced distortions after 5 iterations. Finally, the output at iteration 44 shows that the robot arm has no distortion while its end link is at the target position.

The embodiment described above can be extended to include external constraints such as obstacles. In particular, the elastic distortion algorithm can simulate distortions caused by collisions of an elastic robot arm with obstacles and adjust the link and joint configurations to reduce these distortions until a solution that is free of distortions is found.

What is claimed is:

1. A method of solving the inverse kinematics problem of a kinematic chain with multiple links and joints, comprising:
determining constraints on configurations of the links and joints of the kinematic chain;
pretending that the kinematic chain is elastic, and the links and joints can be distorted so that the configurations of the links and joints can deviate from the constraints;
defining a distortion measurement function which quantifies distortions as a function of deviations of the configurations of the links and joints from the constraints;
running an algorithm that comprises of distorting the pretended elastic kinematic chain to put an end of the kinematic chain in a target position and/or orientation, calculating distortions using the distortion measurement function, and iteratively adjusting the configurations of the links and joints to reduce the distortions while keeping the end of the kinematic chain in the target position and/or orientation until the total distortion of the kinematic chain is zero or smaller than a predetermined threshold, or a maximum number of iterations is reached; and returning the configurations of the links and joints with total distortion being zero or smaller than the predetermined threshold, if found, as an inverse kinematics solution for the kinematic chain.

2. The method of claim 1, wherein the configurations of the links and joints include positions and orientation vectors of the links and joints.

3. The method of claim 1, wherein the constraints of include constraints on the positions and orientation vectors of the links and joints.

4. The method of claim 1, wherein in each iteration the algorithm adjusts the configurations of a set of neighbor links and joints to reduce the total distortion.

5. The method of claim 1, wherein the algorithm adjusts the configurations of the links and joints to reduce the distortions by using an optimization method such as Gradient Descent to find configurations that minimize the distortions.

6. The method of claim 5, wherein the distortion measurement function is a piece-wise linear function of the configurations of the links and joints, and the optimization method is a Piece-wise Linear Programing method.

7. The method of claim 1, wherein the algorithm adjusts the configurations of the links and joints to reduce the distortions by calculating elastic forces caused by the distortions and applying the calculated elastic forces to change the configurations of the links and joints.

8. The method of claim 1, wherein the algorithm adjusts the configurations of the links and joints to reduce the distortions by correcting the deviations of the configurations of the links and joints from the constraints.

9. The method of claim 1, wherein the constraints include constraints imposed by obstacles and other external conditions and the distortion measurement function includes calculating distortions caused by deviations from the constraints imposed by obstacles and other external conditions.

10. An apparatus of solving the inverse kinematics problem of a kinematic chain with multiple links and joints, comprising a computer running a computer program that:
receives as inputs a set of constraints on configurations of the links and joints of the kinematic chain;
simulates that the links and joints of the kinematic chain can be distorted so that the configurations of the links and joints can deviate from the constraints;
defines a distortion measurement function which quantifies distortions as a function of deviations of the configurations of the links and joints from the constraints;
executes an algorithm that comprises of distorting the simulated kinematic chain to put an end of the kinematic chain in a target position and/or orientation, calculating distortions using the distortion measurement function, and iteratively adjusting the configurations of the links and joints to reduce the distortions while keeping the end of the kinematic chain in the target position and/or orientation until the total distortion of the kinematic chain is zero or smaller than a predetermined threshold, or a maximum number of iterations is reached; and
returns the configurations of the links and joints with total distortion being zero or smaller than the predetermined threshold, if found, as an inverse kinematics solution for the kinematic chain.

11. The apparatus of claim 10, wherein the configurations of the links and joints include positions and orientation vectors of the links and joints.

12. The apparatus of claim 10, wherein the constraints of include constraints on the positions and orientation vectors of the links and joints.

13. The apparatus of claim 10, wherein in each iteration the algorithm adjusts the configurations of a set of neighbor links and joints to reduce the total distortion.

14. The apparatus of claim 10, wherein the algorithm adjusts the configurations of the links and joints to reduce the distortions by using an optimization method such as Gradient Descent to find configurations that minimize the distortions.

15. The apparatus of claim 14, wherein the distortion measurement function is a piece-wise linear function of the configurations of the links and joints, and the optimization method is a Piece-wise Linear Programing method.

16. The apparatus of claim 10, wherein the algorithm adjusts the configurations of the links and joints to reduce the distortions by calculating elastic forces caused by the distortions and applying the calculated elastic forces to change the configurations of the links and joints.

17. The apparatus of claim 10, wherein the algorithm adjusts the configurations of the links and joints to reduce the distortions by correcting the deviations of the configurations of the links and joints from the constraints.

18. The apparatus of claim 10, wherein the constraints include constraints imposed by obstacles and other external conditions and the distortion measurement function includes calculating distortions caused by deviations from the constraints imposed by obstacles and other external conditions.

* * * * *